United States Patent
Mitchell et al.

(10) Patent No.: US 10,246,087 B2
(45) Date of Patent: Apr. 2, 2019

(54) SYSTEM AND METHOD FOR COLLISION MITIGATION DURING MACHINE ARTICULATION

(71) Applicant: Caterpillar Inc., Peoria, IL (US)

(72) Inventors: Michael D. Mitchell, Aurora, IL (US); Adam M. Plecker, Joliet, IL (US); Mark A. Robinson, Davis Junction, IL (US); Shaun R. Melchiori, Naperville, IL (US)

(73) Assignee: Caterpillar Inc., Deerfield, IL (US)

( * ) Notice: Subject to any disclaimer, the term of this patent is extended or adjusted under 35 U.S.C. 154(b) by 141 days.

(21) Appl. No.: 15/380,623

(22) Filed: Dec. 15, 2016

(65) Prior Publication Data
US 2018/0170369 A1   Jun. 21, 2018

(51) Int. Cl.
*B60W 30/09* (2012.01)
*B60W 50/12* (2012.01)
*B60W 10/10* (2012.01)
*B62D 1/02* (2006.01)
*G05D 1/00* (2006.01)
*B62D 12/00* (2006.01)
(Continued)

(52) U.S. Cl.
CPC ........ *B60W 30/09* (2013.01); *B60W 50/0098* (2013.01); *B60W 50/10* (2013.01); *B60W 50/12* (2013.01); *B62D 1/02* (2013.01); *B62D 12/00* (2013.01); *B62D 15/029* (2013.01); *G05D 1/0055* (2013.01); *B60W 2300/15* (2013.01); *B60W 2420/42* (2013.01); *B60W 2420/52* (2013.01); *B60W 2720/22* (2013.01); *G05D 2201/0201* (2013.01)

(58) Field of Classification Search
CPC ...... B60W 30/09; B60W 50/12; B60W 50/10; B60W 50/0098; B60W 2720/22; B60W 2420/52; B60W 2420/42; B60W 2300/15; B62D 12/00; B62D 1/02; G05D 1/0055; G05D 2201/0201
See application file for complete search history.

(56) References Cited

U.S. PATENT DOCUMENTS

| 7,721,842 | B2 | 5/2010 | Forero | |
| 2006/0130750 | A1* | 6/2006 | Ishikawa | G03B 27/32 118/300 |

(Continued)

FOREIGN PATENT DOCUMENTS

CN   104691616 A  *  6/2015

*Primary Examiner* — Rodney A Butler
(74) *Attorney, Agent, or Firm* — Oblon, McClelland, Maier & Neustadt

(57) ABSTRACT

A system and method for mitigating collisions for an articulated work vehicle is disclosed. The system includes a controller configured to determine a safe-zone around the articulated work vehicle based on signals corresponding to sensed objects around the articulated work vehicle. The controller is further configured to determine a position and velocity of one or more peripheral points on the articulated work vehicle based on signals from a set of sensor systems operatively coupled to the articulated work vehicle. The controller is further configured to receive a driver control input. The controller is further configured to apply a limit to the driver control input when a peripheral point on the articulated work vehicle is expected to be within a predetermined distance to a nearest edge of the safe-zone.

20 Claims, 6 Drawing Sheets

(51) Int. Cl.
  *B60W 50/10*  (2012.01)
  *B60W 50/00*  (2006.01)
  *B62D 15/02*  (2006.01)

(56)  References Cited

U.S. PATENT DOCUMENTS

2008/0053741 A1\* 3/2008 Forero .................. B62D 6/002
   180/418
  2013/0191000 A1\* 7/2013 Hahne .............. G08G 1/096725
   701/70
  2017/0329334 A1\* 11/2017 Kashiwagi ........... G05D 1/0088

\* cited by examiner

SYSTEM AND METHOD FOR COLLISION MITIGATION DURING MACHINE ARTICULATION

TECHNICAL FIELD

The present disclosure relates to a work vehicle, and more particularly, to a collision mitigation system and method for the work vehicle.

BACKGROUND

Industries, such as construction, agriculture, mining, often employ articulated machines. An articulated machine, generally, includes front and rear frames hinged together by a hitch joint for relative pivotal movement. When one of the frames is moved relative to the other, the articulated machine turns to change a direction of travel. Unlike cars and trucks that can change direction only by rotating the wheels, articulated machine require a clearance distance of at least half the machine's length in order to complete a turn. This large reconfiguration of the machine's clearance distance may sometimes be hazardous in confined areas, when the machine is in close proximity with surrounding external objects including, but not limited to, other working machines, buildings and rocks. This may introduce difficulties or unanticipated interactions with the surrounding objects and lead to collisions when executing a turn or other operations in such machines.

U.S. Pat. No. 7,721,842 B2 (hereinafter referred to as the '842 patent) relates to an articulated work vehicle steering system with controlled steering cushioning and associated method. The steering system is provided for a work vehicle including articulated first and second vehicle sections. The steering system includes a controller adapted to determine from a speed-request signal, if a requested steering speed requested for the first vehicle section relative to the second vehicle section, about an articulation axis towards an end of an end region of a position range of the first vehicle section, is at least equivalent to a predetermined steering speed. The steering system further includes determining from a position signal if the first vehicle section is positioned in the end region of the position range; and, if the requested steering speed is at least the predetermined steering speed and the first vehicle section is positioned in the end region, and based on that signals that an actual steering speed of the first vehicle section be lower than the requested steering speed.

The steering system of the '842 patent provides manipulation of steering speed of an articulated work vehicle; however, such steering system does not provide any means to detect and/or prevent or mitigate collisions of such machines with external objects.

SUMMARY

In one aspect of the present disclosure, an articulated work vehicle is described. The articulated work vehicle includes a front frame having a first pair of wheels and a rear frame having a second pair of wheels. The articulated work vehicle also includes a hitch pivotally coupling the front frame to the rear frame. The articulated work vehicle includes a powertrain configured to drive the first and second pair of wheels. The articulated work vehicle further includes a steering system configured to provide controlled articulation of the front frame relative to the rear frame about the hitch based on a driver control input. The articulated work vehicle includes a first sensor system configured to sense objects around the articulated work vehicle, a second sensor system configured to sense real-time articulation angle of the front frame relative to the rear frame and a third sensor system configured to sense real-time rotation of the first and second pair of wheels. The articulated work vehicle also includes real time processing circuitry electrically coupled to the steering system, the first sensor system, the second sensor system, and the third sensor system. The processing circuitry is configured to determine a safe-zone around the articulated work vehicle based on signals from the first sensor system corresponding to sensed objects around the articulated work vehicle. The processing circuitry is further configured to determine a position and velocity of one or more peripheral points on the articulated work vehicle based on signals from the second sensor system, and the third sensor system. The processing circuitry is configured to receive the driver control input. The processing circuitry is further configured to apply a limit to the driver control input when a peripheral point on the articulated work vehicle is expected to be within a predetermined distance to a nearest edge of the safe-zone.

In another aspect of the present disclosure, a collision mitigation system for an articulated work vehicle is described. The collision mitigation system includes a memory configured to store program instructions and sensor signals. The collision mitigation system also includes a controller in communication with the memory. The controller is configured to determine a safe-zone around the articulated work vehicle based on signals from a first sensor system corresponding to sensed objects around the articulated work vehicle. The controller is also configured to determine a position and velocity of one or more peripheral points on the articulated work vehicle based on signals from a set of sensor systems operatively coupled to the articulated work vehicle. The controller is also configured to receive a driver control input. The controller is further configured to apply a limit to the driver control input when a peripheral point on the articulated work vehicle is expected to be within a predetermined distance to a nearest edge of the safe-zone.

In yet another aspect of the present disclosure, a method for mitigating collisions for an articulated work vehicle is described. The method includes determining a safe-zone around the articulated work vehicle based on signals from a first sensor system corresponding to sensed objects around the articulated work vehicle. The method further includes determining a position and velocity of one or more peripheral points on the articulated work vehicle based on signals from a set of sensor systems operatively coupled to the articulated work vehicle. The method also includes receiving a driver control input. The method further includes applying a limit to the driver control input when a peripheral point on the articulated work vehicle is expected to be within a predetermined distance to a nearest edge of the safe-zone.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some

DETAILED DESCRIPTION

Figure 1:
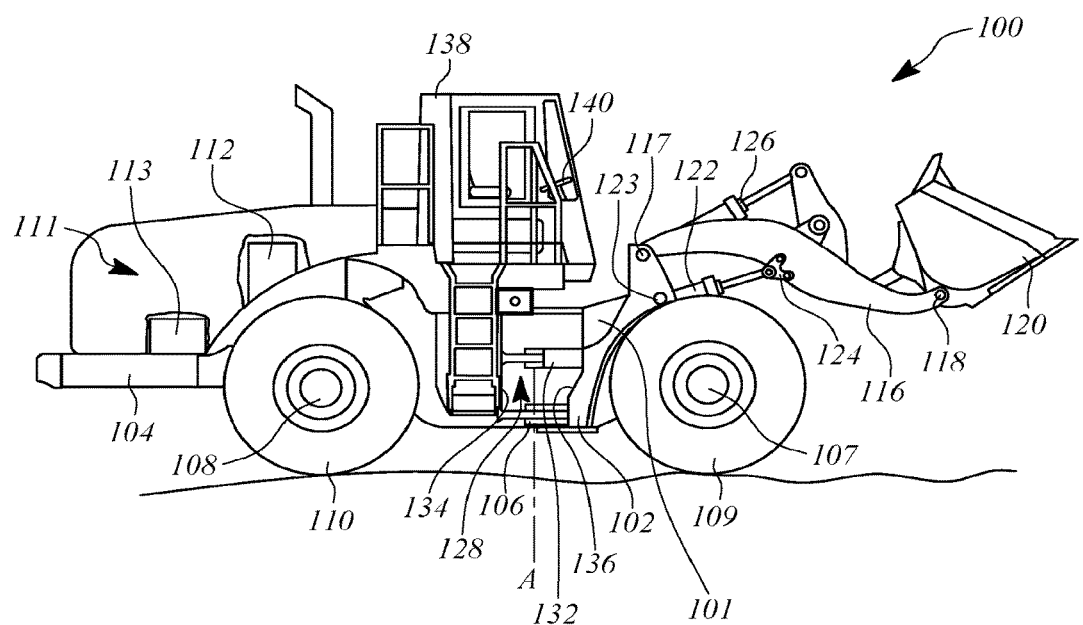
FIG. 1 illustrates a diagrammatic side view of an exemplary articulated work vehicle, in accordance with one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, corresponding or similar reference numbers will be used throughout the drawings to refer to the same or corresponding parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural references unless the context clearly dictates otherwise. That is, unless clearly specified otherwise, as used herein the words "a" and "an" and the like carry the meaning of "one or more." Additionally, it is to be understood that terms such as "left," "right," "up," "down," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the present disclosure can provide a collision mitigation system for an articulated work vehicle which involves overriding an operator's steering command to avoid or mitigate collision of the articulated work vehicle by using information related to articulation angle, geometry of the machine's periphery and external objects surrounding the articulated work vehicle, while the articulated work vehicle is in operation. Embodiments of the disclosed subject matter can alternatively limit swing command in a work vehicle having a center pivot arrangement.

Referring to FIG. 1, an articulated work vehicle, generally referenced by the numeral 100, is illustrated. FIG. 1, in particular, illustrates an articulated wheel loader machine which may be employed in industries, such as construction, agriculture, and mining. Although embodiments of the disclosed subject matter are described in relation to an articulated wheel loader machine, embodiments of the disclosed subject matter are not so limited, and may be equally applicable to other earth working machines, such as a hydraulic excavator, a scraper, a haul truck, a motor grader, and any other machine having an articulating arrangement. Further, while a wheeled work machine is shown and described, embodiments of the disclosed subject matter may also be implemented in other work machines, including track-type work machines. Hereinafter, the "articulated work vehicle 100" has been simply referred to as "machine 100" without any limitations. Also, as noted above, embodiments of the disclosed subject matter can pertain to a work vehicle that does not have an articulating arrangement, and instead has a center pivot arrangement, in which case the swing command may be limited.

Figure 2:
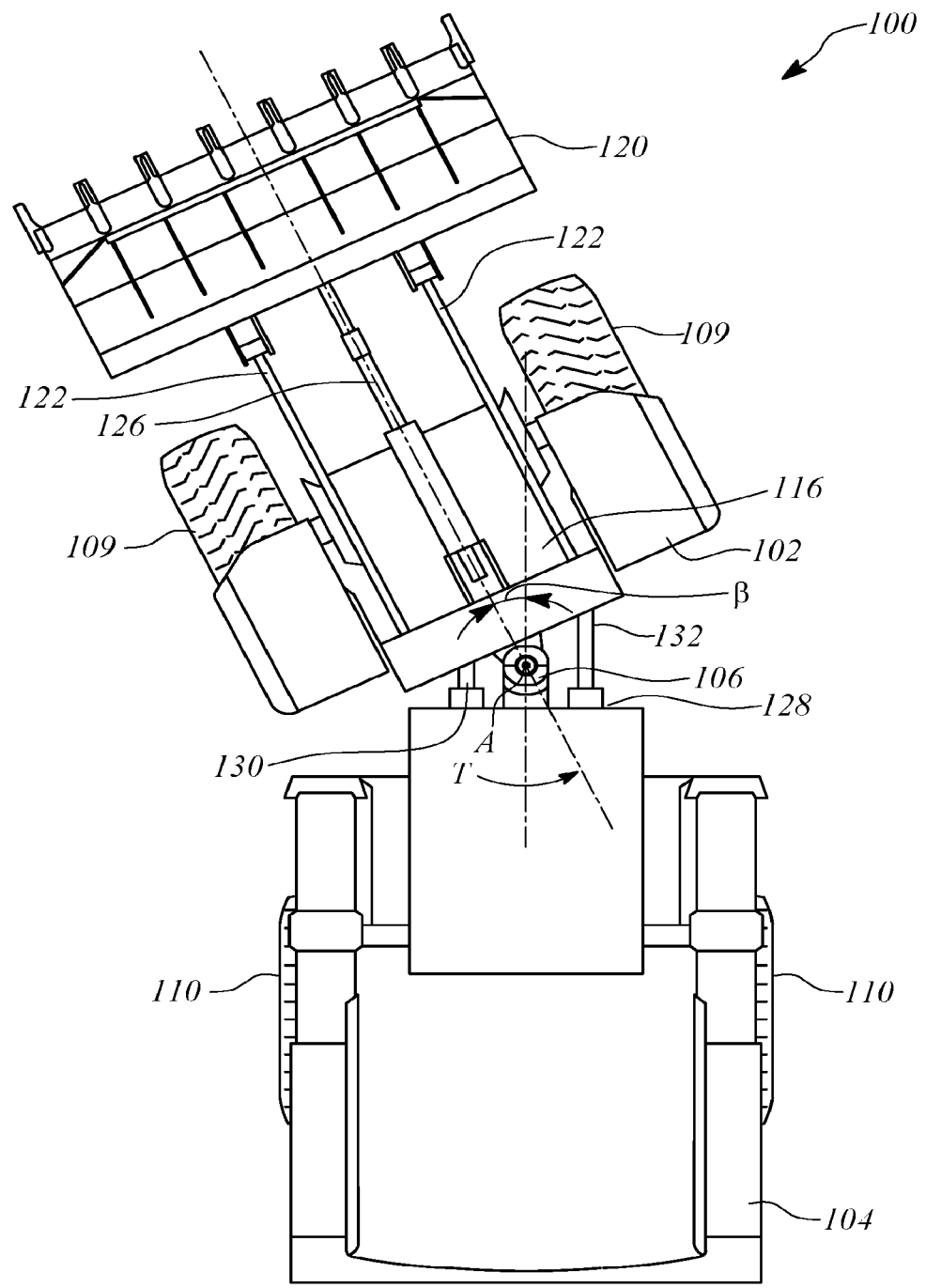
FIG. 2 illustrates a schematic top view of the exemplary articulated work vehicle with a front frame articulated about a rear frame thereof, in accordance with one or more embodiments of the present disclosure.

In general, the machine 100 includes a body 101 to support the various components therein. Referring to FIGS. 1-2 in combination, the machine 100 can include a front frame 102 and a rear frame 104. Further, as illustrated, the front frame 102 and the rear frame 104 are pivotally coupled together by a hitch 106. The hitch 106 provides an articulation joint to couple the front frame 102 to the rear frame 104. The term "hitch" as used herein can encompass an articulation joint; and hereinafter, the term "hitch 106" has been interchangeably used with the term "articulation joint 106." In particular, the hitch 106 may have spaced apart mounting portions (not shown), fixed to each of the front frame 102 and the rear frame 104, which may be affixed together (e.g., pinned together) along a generally vertical axis, represented by 'A' in the drawings. With this configuration, the mounting portions along with the front frame 102 and the rear frame 104 may swivel about the vertical axis 'A,' thereby allowing the machine 100 to steer using the vertical axis 'A,' as described in detail below.

Figure 3:
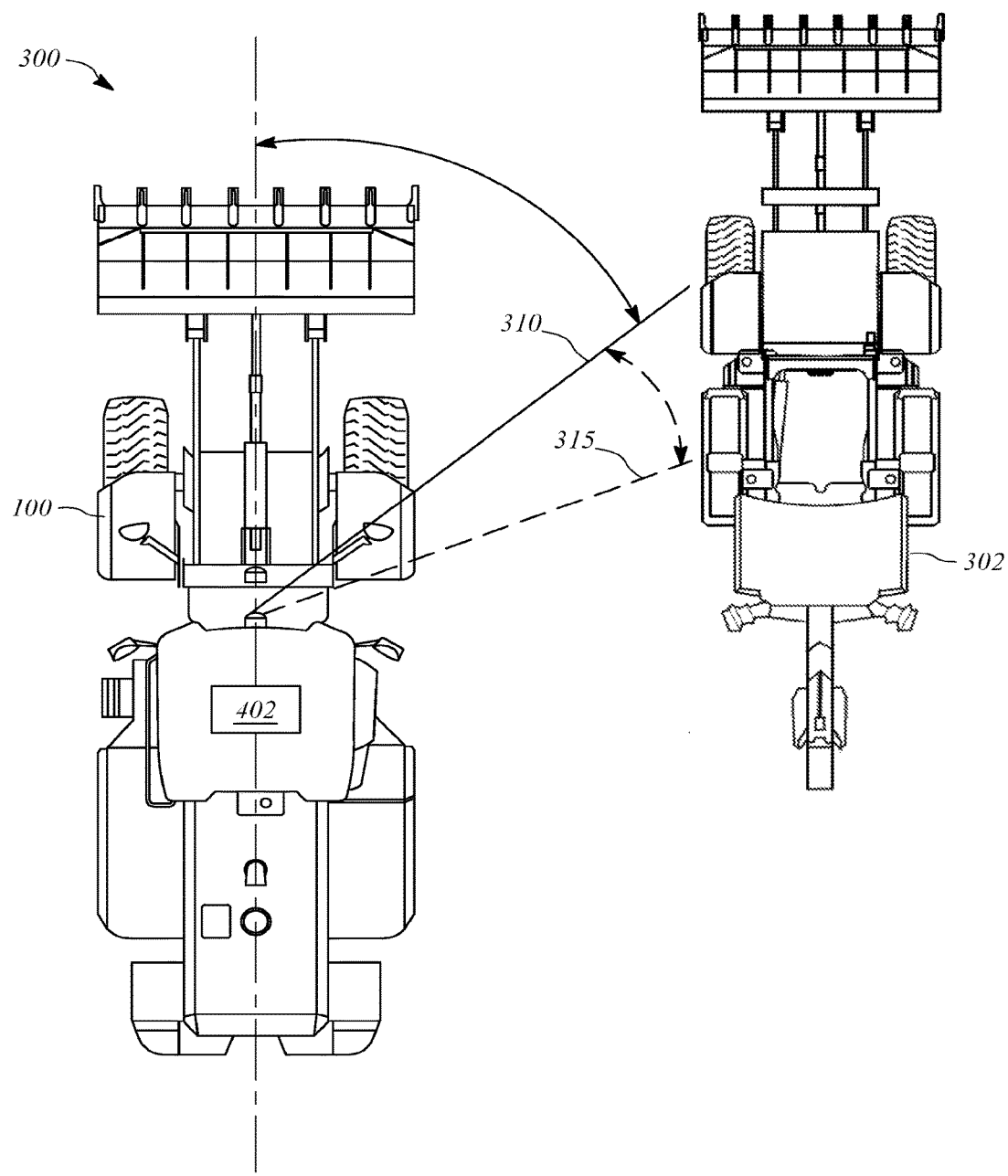
FIG. 3 illustrates a top plan view of the exemplary articulated work vehicle with an external object located at a surrounding thereof, according to one or more embodiments of the present disclosure.

The machine 100 may include a front axle assembly 107 supported on the front frame 102 and a rear axle assembly 108 supported on the rear frame 104. The machine 100 may also include a first pair of wheels 109 and a second pair of wheels 110 supported by the front axle assembly 107 and the rear axle assembly 108, respectively. FIG. 1 shows one wheel of each of the first and second pairs of wheels 109, 110. Further, the machine 100 can include a powertrain 111, for example, mounted on the rear frame 104. The powertrain 111, generally, may include a power source 112 and a transmission 113, which may provide motive power to at least the second pairs of wheels 110, and thereby provide movement to the machine 100. The power source 112 may be, for example, a diesel engine, a gasoline engine, a natural gas engine, an electrical engine, a hybrid engine, or any other engine known in the art. The power source 112 may alternatively be a fuel cell, power storage device, or the like. Further, the transmission 113 may be a mechanical transmission, a hydraulic transmission, or any other transmission type known in the art. In some examples, the transmission 113 may be operable to produce multiple output speed ratios (or a continuously variable speed ratio) between the power source 112 and the driven first and second pairs of wheels 109, 110. In the illustration of FIG. 3, for example, the transmission 113 may include a front differential and a rear differential (not shown) coupled with the front axle assembly 107 and the rear axle assembly 108. In some examples, the transmission 113 may further include a torque converter (not shown) that can assist with transmission of torque generated by the power source 112.

The machine 100, in some embodiments, may also include a lift arm 116, typically, supported on the front frame 102. As illustrated, the lift arm 116 has a first end portion 117 that is pivotally mounted to the front frame 102 and a second end portion 118 that mounts a hydraulically controlled tool 120, hereinafter simply referred to as "tool 120." The lift arm 116 may move in a generally vertical plane by a pair of lift cylinders 122 (one shown in FIG. 1) pivotally mounted to the front frame 102 at a first end 123, and mounted to the lift arm 116 at a second end 124. The tool 120 may be a work implement, such as a bucket, as illustrated in FIG. 1, for loading and unloading matter or material. Further, as illustrated, the tool 120 may be pivotally mounted to the lift arm 116, and can be rotatable about the mounting by a linkage cylinder 126, which is pivotally mounted between the lift arm 116 and the tool 120. In one example, the linkage cylinder 126 is a telescopic cylinder with a piston and hydraulic fluid therein. For the purpose of this description, the lift arm 116 along with the tool 120 may, generally, be considered part of the body 101 of the machine 100.

The machine 100 can also include a steering system 128 to control an articulation of the front frame 102 with respect to the rear frame 104 about the vertical axis 'A.' Referring to FIG. 2, as seen from the top view of the machine 100, the steering system 128 can include a first steering cylinder 130 located on a left side of the machine 100 and a second steering cylinder 132 located on a right side of the machine 100, from the perspective of the operator of the machine 100. In particular, the first steering cylinder 130 and the second steering cylinder 132 may be supported between a front portion 134 of the rear frame 104 and a rear portion 136 of the front frame 102. The first and second steering cylinders 130, 132 can be actuated in an opposite manner to control the steering function. In other words, the first steering cylinder 130 can be extended while the second steering cylinder 132 is being retracted, and vice versa. Such coordinated actuation of the steering cylinders 130, 132 can effect steering of the machine 100, subject, of course, to other forces acting on machine 100, such as forces acting on the tool 120 and one or more wheels of the first and second pairs of wheels. For example, the first steering cylinder 130 located on the left side of the machine 100 may retract while the second steering cylinder 132 located on the right side of the machine 100 simultaneously extends, thereby causing the front frame 102 to pivot counterclockwise about the vertical axis 'A' relative to the rear frame 104 and steering the machine 100 towards the left side. However, in one or more embodiments of the disclosed subject matter, a different configuration of the steering system 128 may be utilized to steer the machine 100, such as a single steering cylinder located at only one side of the machine 100. Further, the steering cylinders 130, 132 may be replaced with other types of actuators, for example, electric motors, hydraulic motors, or the like.

As illustrated in FIG. 1, the machine 100 may further include an operator station 138. The operator station 138 may include different interface devices (not shown) used for control of the machine 100, along with a variety of displays or indicators to convey information to the operator. The interface devices may include, for example, wheels, joysticks, buttons, switches, touchscreens, or other devices used to control movement, such as pivoting, rotating, curling, sliding, swinging, etc. of the first pair of wheels 109 and the lift arm 116, and thereby define the overall articulation and outer limits of peripheral points of the machine 100. In particular, the interface devices can include a steering control 140 associated with the steering system 128. In one example, the steering control 140 may be in the form of a steering wheel which may be rotated to control the rotational movement of the front frame 102 with respect to the rear frame 104 about the vertical axis 'A,' as desired. In other examples, the steering control 140 may be in the form of joysticks, buttons, touchscreen, etc. without any limitations.

Referring to FIG. 2, it may be seen that the machine 100 is positioned at an articulation angle 'β,' where the front frame 102 is rotated to the left or counter-clockwise relative to the rear frame 104. In an example, a positive value of the articulation angle 'β' may be indicative of counterclockwise pivoting of the front frame 102, from the perspective of an operator facing forward, while a negative value of the articulation angle 'β' may be indicative of clockwise pivoting. It may be understood that in FIG. 1, the machine 100 is positioned such that a longitudinal axis of the front frame 102 is aligned with a longitudinal axis of the rear frame 104, and thus, in this case, the articulation angle 'β' is close to zero degrees. As discussed, the steering system 128 can control the rotational movement of the front frame 102 with respect to the rear frame 104 about the vertical axis 'A.' In other words, the steering system 128 may provide a torque at the hitch 106 which causes the rotational movement of the front frame 102 with respect to the rear frame 104 about the vertical axis 'A.' In particular, the torque, at least in part, may be generated by the coordinated extension and retraction of the first and second steering cylinders 130, 132 of the steering system 128.

It may be contemplated that the operations of the machine 100 may be controlled by a driver/operator thereof, usually present in the operator station 138, although the concepts in the present disclosure may also be practiced in a machine 100 that is autonomous or remotely controlled. For instance, the driver may provide a driver control input (hereinafter simply referred to as "control input") to the steering control 140 to command the steering system 128, and thereby provide controlled articulation of the front frame 102 relative to the rear frame 104 about the hitch 106. The driver may achieve this by turning or otherwise moving the steering control 140. It may be understood that the steering control 140 may regulate steering cylinder pressures of the first and second steering cylinders 130, 132 of the steering system 128, and thereby control extension and retraction of the first and second steering cylinders 130, 132, based on the control input. The control input can include values for at least one of an articulation angle, an articulation angular speed, an articulation angle command, one or more steering cylinder pressure, and one or more linkage cylinder pressure; the terms used herein having their usual meanings.

FIG. 3 illustrates an exemplary worksite 300 in which the machine 100 may operate to perform one or more operations. In the illustration of FIG. 3, the machine 100 is shown located in proximity to an external object 302, as shown in the form of another machine, in the worksite 300. The other machine may be a backhoe loader (as shown), a dump truck or any other machine present in the worksite 300, for example. It may be contemplated that although the external object 302 is shown in the form of another machine; the external object 302 may be a fixed structure like a rock or a tree, a moving object or human being, or any other obstacle in the worksite 300. A collision between the machine 100 and the external object 302 can damage either the machine 100 or the external object 302.

Figure 4:
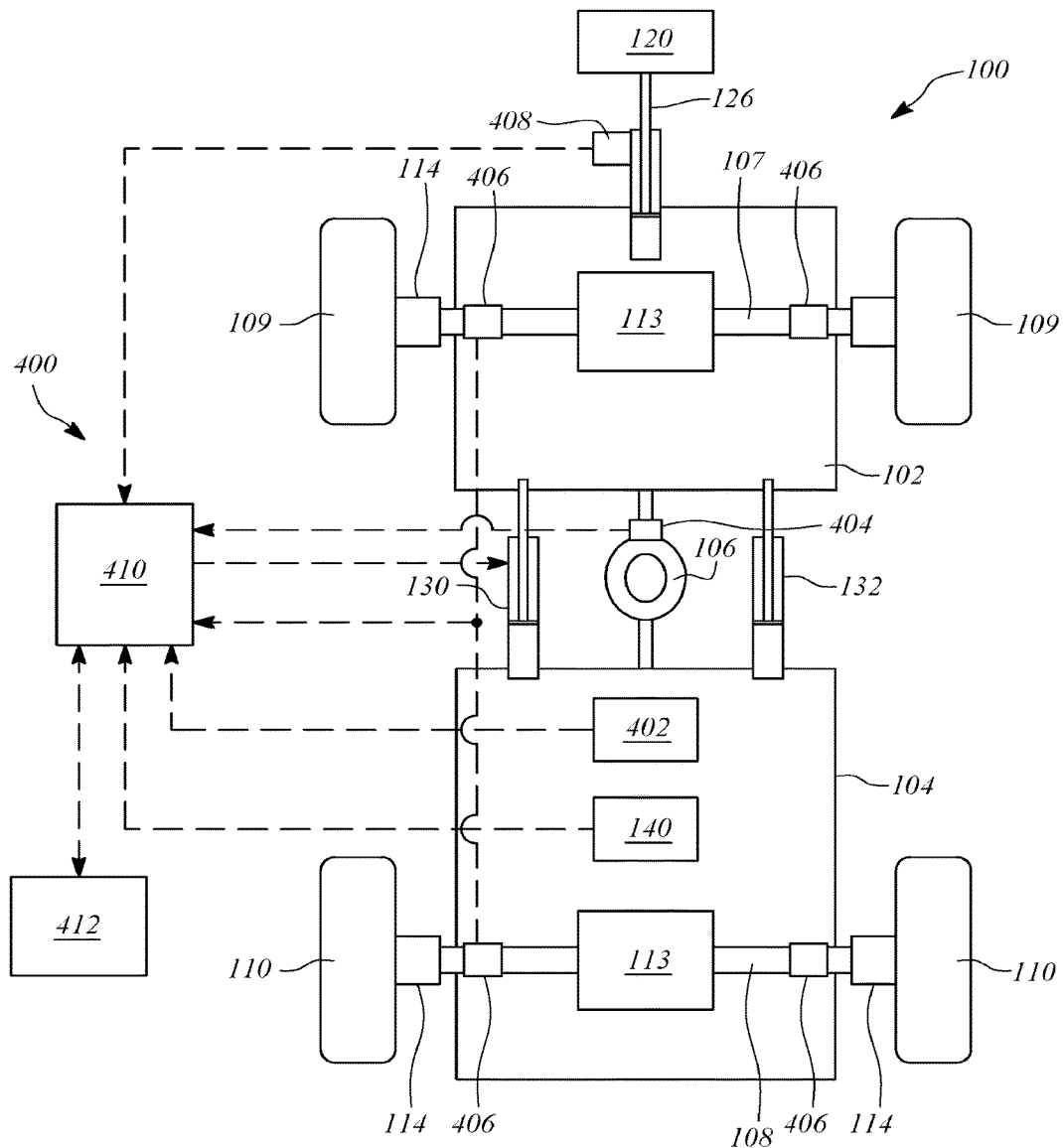
FIG. 4 illustrates a block diagram of the exemplary articulated work vehicle with a collision mitigation system, in accordance with one or more embodiments of the present disclosure.

FIG. 4 illustrates a simplified schematic view of the machine 100. In some embodiments, the machine 100 includes a collision mitigation system 400 (schematically represented in FIG. 4) to detect any external object, like the external object 302, within a certain distance of the machine 100, and to avoid collision by limiting articulation of the machine 100 or mitigate the force of impact of the collision by reducing the articulation rate of the machine 100. In particular, the collision mitigation system 400 may override and/or limit the control input provided by the operator of the machine 100 to control the articulation of the machine 100. The collision mitigation system 400 works based on the information related to machine articulation angle, the machine's peripheral geometry and distances of the external obstacles/objects from the peripheral points of the machine 100 of the machine 100, as will be discussed in detail in the subsequent paragraphs.

In one embodiment, as illustrated in FIG. 4, the collision mitigation system 400 includes a first sensor system 402 configured to sense objects around the machine 100. In some examples, the first sensor system 402 may further be configured to monitor a position of various components of the machine 100, such as, one or more peripheral points of the machine 100, etc. The first sensor system 402 can be mounted over the body 101 of the machine 100 or remotely thereof. In one example, the first sensor system 402 may include one or more cameras. The cameras, as used herein, may include any image capturing device, for example a mono or a stereo camera. Generally, the first sensor system 402 may include a 360° camera positioned, for example, on top of the operator station 138 in the machine 100. Alternatively, the first sensor system 402 may include multiple cameras disposed at various points on the machine 100 and sufficient in number to provide a 360° panoramic view around the machine 100. The first sensor system 402 may include some form of circuitry to stitch received images to generate the 360° panoramic view, which may optionally be displayed to the driver of the machine 100 by means of some form of display unit located in the operator station 138. Typically, the captured images may be concentric images which may be used with photogrammetric techniques to determine a distance of any external object from the body 101 of the machine 100. In other examples, the first sensor system 402 may be sensors/detectors using electromagnetic waves to determine presence of any external object located within a certain distance from the body 101 of the machine 100. The sensors/detectors work on the principle of transmitting electromagnetic waves and receiving the reflected waves from an object, giving information about the object's location, speed, etc. For instance, the first sensor system 402 may include any one of one or more radar (Radio Detection and Ranging) sensors, one or more lidar (Light Detection And Ranging) sensors, one or more sonar (Sound Navigation And Ranging) sensors, and the like.

The collision mitigation system 400 may also include multiple sensors, such as, capacitive, resistive, potentiometric, piezoelectric, or any other type of electromechanical sensors, associated with various components of the machine 100 for sensing a variety of different parameters in order to assess location of all peripheral points of the machine 100. For instance, the collision mitigation system 400 may include a second sensor system 404 configured to sense real-time articulation angle 'β' of the front frame 102 relative to the rear frame 104. The second sensor system 404 may include one or more rotary position sensors, such as, but not limited to, hitch angle sensor using gyroscopes and/or accelerometers, operatively associated with the hitch 106 to determine the articulation angle 'β.' Alternatively, the second sensor system 404 may include steering cylinder sensors associated with each of the first and second steering cylinders 130, 132 to determine the steering cylinder pressure values which in turn maybe used to determine the real-time articulation angle 'β' of the front frame 102 relative to the rear frame 104. In some examples, the second sensor system 404 may further utilize a sequence of values of the determined real-time articulation angle 'β' to calculate an articulation rate, i.e., the rate of change of the articulation angle 'β' in the machine 100, in any known manner. Further, the collision mitigation system 400 may include a third sensor system 406 configured to sense real-time rotation of the first and second pair of wheels 109, 110. The third sensor system 406 may include one or more rotation sensors separately associated with each of the first pair of wheels 109 and the second pair of wheels 110 to determine position and speed, of the wheels 109, 110. Furthermore, the machine 100 may, in some embodiments, include a fourth sensor system 408 configured to sense real-time position of the hydraulically controlled tool 120 therein. The fourth sensor system 408 may include one or more rotary position sensors, such as, but not limited to, gyroscopes and/or accelerometers operatively associated with the lift arm 116 to determine an angle, and thereby the position of the hydraulically controlled tool 120 with respect to the body 101 of the machine 100. Alternatively, the fourth sensor system 408 may include a linkage cylinder sensor (not shown) associated with the linkage cylinder 126 to determine the linkage cylinder pressure which may be used to determine the position of the hydraulically controlled tool 120 with respect to the body 101 of the machine 100.

In some embodiments, the collision mitigation system 400 may include real time processing circuitry 410, hereinafter simply referred to as "controller 410." The controller 410 may be disposed in signal communication with each of the first sensor system 402, the second sensor system 404, the third sensor system 406 and the fourth sensor system 408. The controller 410 may be a logic unit using one or more integrated circuits, microchips, microcontrollers, microprocessors, all or part of a Central Processing Unit (CPU), Graphics Processing Unit (GPU), Digital Signal Processor (DSP), Field Programmable Gate Array (FPGA), or other circuits suitable for executing instructions or performing logic operations. Other peripheral circuitry such as buffers, latches, switches and so on may be implemented within the controller 410 or separately as desired. Various other circuits may also be associated with the controller 410, such as power supply circuitry, signal conditioning circuitry, solenoid driver circuitry, and other types of circuitry. Further, the collision mitigation system 400 can include a memory 412 in communication with the controller 410 and configured to store program instructions and sensor signals. The memory 412 may include a non-transitory computer readable medium, such as RAM, ROM, a flash memory, a hard drive, etc. The memory 412 may further be configured to store electronic data associated with operations of the machine 100.

In some embodiments, the controller 410, in the collision mitigation system 400, may be configured to determine a safe-zone around the machine 100 based on signals from the first sensor system 402 corresponding to sensed objects around the machine 100. As used herein, the "safe-zone" may be defined as a region around the body 101 of the machine 100 within which the components located at extreme peripheral points thereof can move or articulate without a risk of colliding with any external object. It may be understood that the safe-zone may be in the form of a three-dimensional envelope around the machine 100. In some implementations, the safe-zone may define a maximum angle of articulation of the machine 100 represented, for example, by a solid line 310 in FIG. 3. In particular, the region between the body 101 and an arc defined by the solid line 310 provides the safe-zone in which the machine 100 may freely articulate without the risk of collision. Further, the region beyond the boundary, for example the articulation angle indicated by the dashed line 315 in FIG. 3, is where there is a possibility of a collision with the external object 302, as the machine 100 moves or articulates.

Further, the controller 410, in the collision mitigation system 400, may be configured to determine a position and velocity of one or more peripheral points on the machine 100 based on signals from the second sensor system 404, the third sensor system 406, and the fourth sensor system 408. The term "peripheral points," as used herein, is any point located on outer or extreme edges of the body 101 of the machine 100; for example, in particular, lateral edges of the tool 120 as the front frame 102 is articulated with respect to the rear frame 104. It may be contemplated by a person skilled in the art that the position and velocity of the one or more peripheral points may be determined by considering the articulation angle 'β' and the articulation rate of the front frame 102 with respect to the rear frame 104 (as determined by the second sensor system 404), the movement of the machine 100 (as determined by the third sensor system 406), and further real-time position of the tool 120 (as determined by the fourth sensor system 408).

Further, the controller 410, in the collision mitigation system 400, may be configured to receive the control input, as provided by the steering control 140. In some implementations, the controller 410 may also receive a steering angle signal representative of a steering angle (which may be equivalent to the articulation angle 'β'), a steering rate signal representative of a rate at which the steering angle is changing (which may be equivalent to the articulation rate), wheel rotation signals representative of motion of the wheels 109, 110, and a plurality of cylinder pressure signals representative of pressure of respective steering cylinders 130, 132 (which may be equivalent to the steering cylinder pressure).

Furthermore, the controller 410, in the collision mitigation system 400, is further configured to apply a limit to the control input when at least one peripheral point on the machine 100 is expected to be within a predetermined distance to a nearest edge of the safe-zone. The limit may be applied by limiting articulation between the front frame 102 and the rear frame 104 of the machine 100. In general, the controller 410 determines impending collision between one or more peripheral points in the machine 100 and the external object 302. In one example, the controller 410 may implement torque or speed reduction control at the hitch 106 to reduce the rate of articulation of the front frame 102 relative to the rear frame 104 about the hitch 106. In other examples, the controller 410 may implement torque or speed reduction control at the hitch 106 to provide a hard stop on the articulation of the front frame 102 relative to the rear frame 104 about the hitch 106. The limit to the control input, or the torque reduction, is implemented in a manner such that the movement of the one or more peripheral points (having a risk of collision with the external object 302) on the body 101 is restricted within the safe-zone in order to avoid impending collision; or at least the velocity of such peripheral points is reduced to mitigate the impact of collision between the machine 100 and the external object 302, for example if the machine 100 could not be stopped within the safe-zone. It may be understood that the controller 410 may compute the necessary torque reduction amount from the articulation characteristics of the machine 100. Further, the controller 410 may reduce the torque or speed by the computed amount, for instance, by modulating the powertrain 111 and/or the steering system 128 of the machine 100. For example, as shown in FIG. 4, the controller 410 may send commands to a steering valve or both of the steering cylinders 130, 132 to control articulation of the machine 100.

In one embodiment, the controller 410 may be able to dynamically adjust the limit on the control input by considering the real-time signals from the sensors systems 402, 404, 406, 408. For instance, if an external object moves within a pre-calculated safe-zone while the front frame 102 is articulating with respect to the rear frame 104 (as determined by the first sensor system 402), the controller 410 may dynamically update the boundaries of the safe-zone in consideration of the newly moved external object 302 within proximity of the machine 100.

In some examples, the controller 410 may further include a feedback unit (not shown) for an operator of the machine 100, as one of the interface devices in the operator station 138. The feedback unit may be in the form of a warning light to notify the operator in advance, for example, that torque or speed reduction is being implemented because an impending collision with an external object 302 has been determined. In some examples, the controller 410 may further include a computing unit (not shown) which may record and/or transmit to a remote location, in real time or in a batch, the number of all collisions that had been avoided at various locations of the worksite 300. This may help to develop a better navigation plan of the machine 100 in order to avoid such obstacles during operation in the worksite 300. The controller 410 may further record and/or transmit magnitude of the contact between the body 101 and the external object 302, in cases when the collision could not be prevented, based on velocity of the machine's travel.

INDUSTRIAL APPLICABILITY

Machines having independent front and rear frames, articulated with respect to each other about a vertical axis, are widely used in off-road industries. For example, many wheel loaders are articulated machines that steer at least by "bending" the front and/or rear frames with respect to each other (and not by directly "turning" the wheels in some instances). In such machines, as the articulation between the front frame and the rear frame increases, a clearance distance required for completing a turn may approach up to at least half the machine's length. This large reconfiguration of the machine's safe operating zone may, sometimes, be hazardous in confined areas, whether it is in close proximity with surrounding external objects including, but not limited to, other working machines, buildings and rocks. This may introduce difficulties or unanticipated interactions with the surrounding objects and collisions during executing a turn or operation in such machines.

The present disclosure provides a collision mitigation system 400 which acquires information relating to articulation angle of the machine 100, implement arm geometry and external obstacles using various sensors and in case of an impending collision with an external object, like the external object 302, a steering override is performed by the collision mitigation system 400 either to avoid collision by limiting articulation or mitigate the force of impact of the collision by reducing the articulation rate. A main concept relates to an ability to override or alter an operator's steering command (via electro-hydraulic or all electric steering) with the knowledge of external objects in close proximity to the machine 100 (via the first sensor system 402) as well as the articulation angle of the machine 100 (via the second sensor system 404 and the third sensor system 406) and implement arm geometry (via the fourth sensor system 408), to avoid or reduce collision impact. Specifically, the controller 410 keeps track of the structure as well as the location of the peripheral points of the machine 100 in space, e.g. of the tool 120. If an external object, like the external object 302 entered into the safe zone, the controller 410 would determine the remaining angle that the machine 100 can still safely articulate without making contact. If the operator of the machine 100 gave or gives a control input that may cause a collision with the external object 302, the controller 410 takes an action to alter the control input to either avoid contact by limiting articulation, or mitigate the force of impact by reducing the articulation rate as the machine 100 approached the external object 302.

Figure 5:
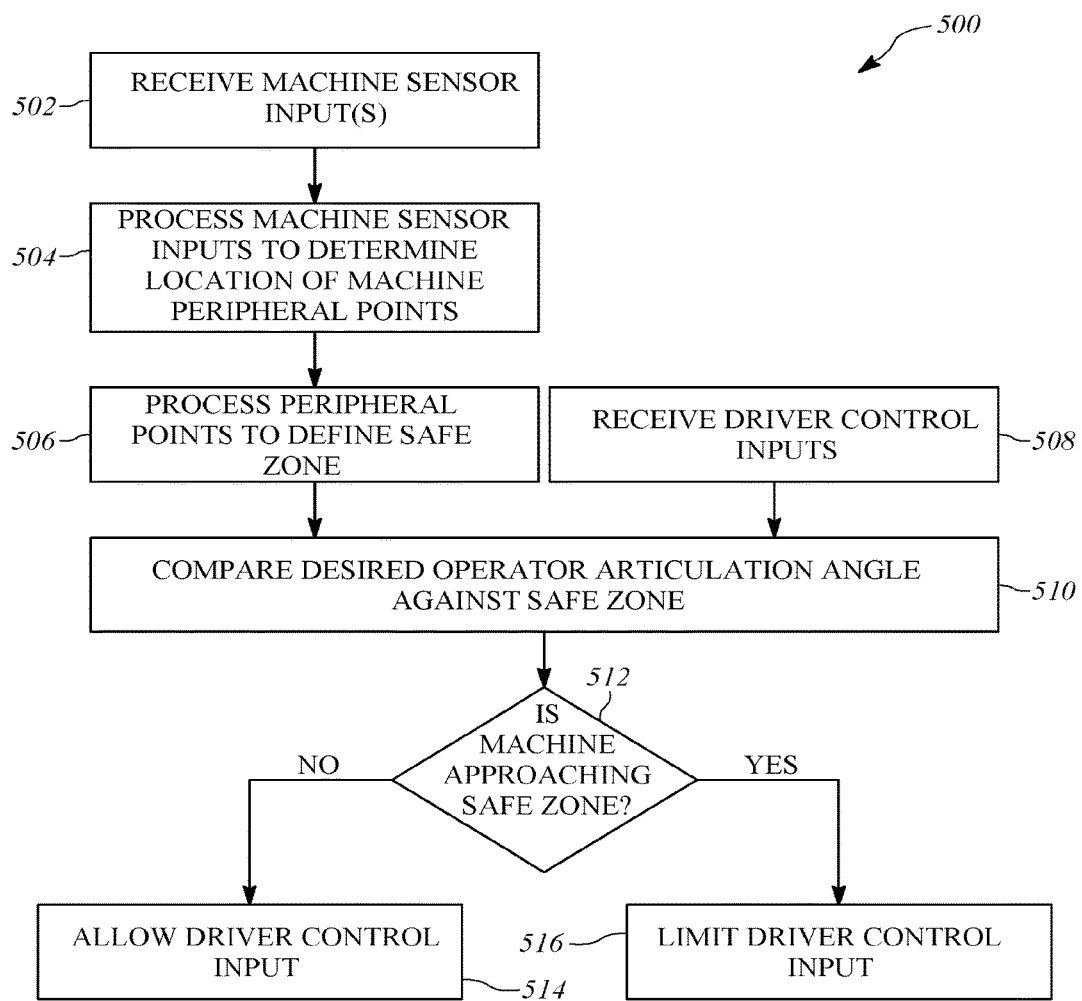
FIG. 5 illustrates a flowchart representing an algorithm to control articulation in the exemplary articulated work vehicle, in accordance with one or more embodiments of the present disclosure.

The working of the collision mitigation system 400 is represented in the form of a flowchart 500 in FIG. 5. At block 502, the controller 410, in the collision mitigation system 400 receives machine sensor inputs, i.e., inputs from one or more of the first sensor system 402, the second sensor system 404, the third sensor system 406 and the fourth sensor system 408. At block 504, the controller 410 processes the machine sensor inputs to determine the location of one or more peripheral points of the machine 100. At block 506, the controller 410 processes the determined one or more peripheral points to define the safe-zone around the machine 100. At block 508, the controller 410 receives the control input to define a desired operator articulation zone, i.e., the extent to which the operator wishes to articulate the machine 100 by evaluating the steering command. At block 510, the controller 410 compares the desired operator articulation zone against the safe-zone. At block 512, the controller 410 checks if the machine 100 is approaching the safe-zone. If NO, at block 514, the controller 410 allows the control input to execute and accordingly articulate the machine 100. If YES, at block 516, the controller 410 limits the control input to keep the articulation of the articulated work vehicle within the safe-zone or limit the articulation torque outside of the safe zone.

Figure 6:
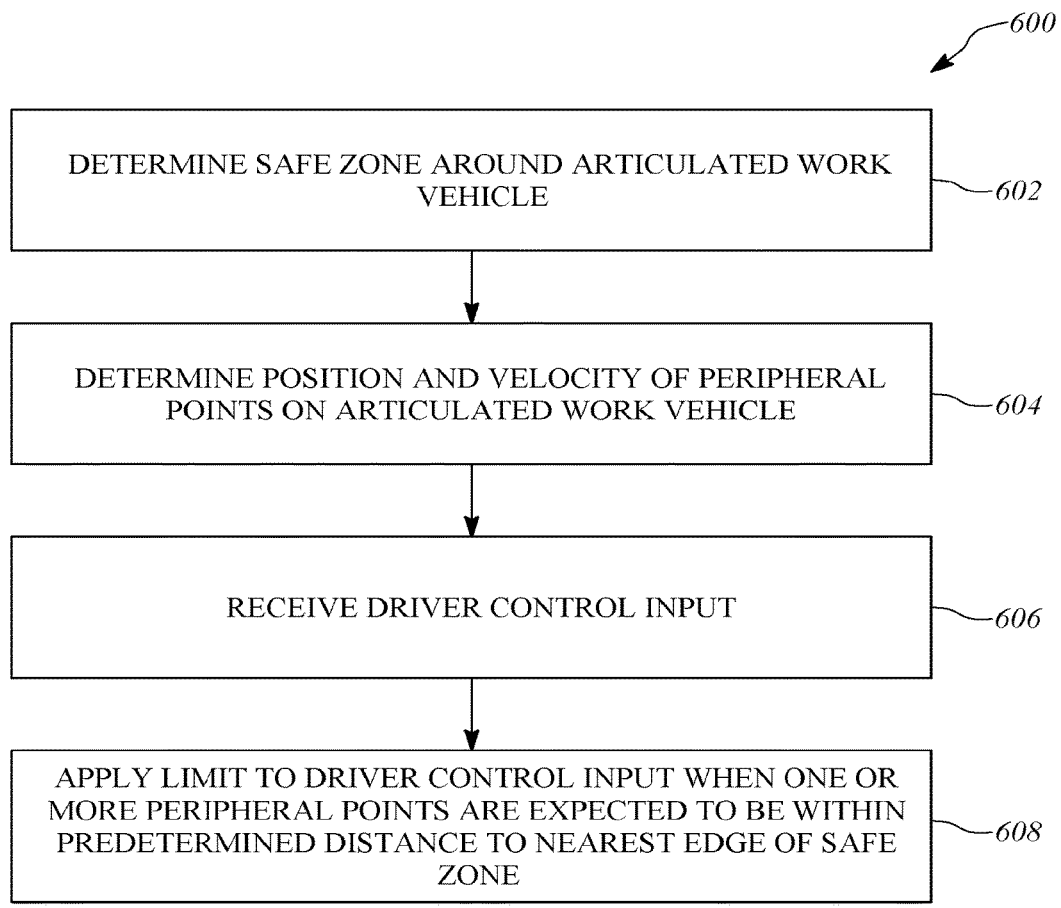
FIG. 6 illustrates a flowchart representing a method for mitigating collisions for the exemplary articulated work vehicle, in accordance with one or more embodiments of the present disclosure.

FIG. 6 illustrates a method 600, represented in the form of a flowchart, for mitigating collisions for the machine 100. Block 602 of method 600 can include determining, using the controller 410, a safe-zone around the machine 100 based on signals from the first sensor system 402 corresponding to sensed objects around the machine 100. Block 604 of the method 600 can include determining, using the controller 410, the position and the velocity of the one or more peripheral points on the machine 100 based on signals from the set of sensor systems 404, 406, 408 operatively coupled to the machine 100. Block 606 of the method 600 can include receiving the control input. Block 608 of the method 600 can include applying, using the controller 410, a limit to the control input when anyone of a peripheral point on the machine 100 is expected to be within a predetermined distance to a nearest edge of the safe-zone. The processes for executing various functions of the controller 410 as used herein have already been described in above paragraphs, and have not been repeated herein in detail for the brevity of the disclosure.

The systems and methods of the present disclosure can prevent possible collisions of the machine 100, or at least reduce the impact of the collisions, with any external object 302 while articulating in the worksite 300. Thereby, embodiments of the present disclosure may reduce or altogether eliminate damage to the machine 100, such as frame damage, axle bending, and/or damage to hydraulic lines. Simultaneously, the embodiments of the present disclosure increase the safety of the operator inside the machine 100 and all those in proximity to the machine 100. Further, the embodiments of the present disclosure allows the operator to perform the steering operation with more ease and precision, and also reduce operator fatigue, as the operator could stay sufficiently confident that the present system may avoid possible collisions if anything goes wrong; and thus it may be contemplated that the present systems may also possibly help with training of inexperienced operators. Furthermore, the embodiments of the present disclosure allow the machine 100 to operate in confined spaces or tight quarters of the worksite 300, thereby improving overall machine's efficiency.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An articulated work vehicle comprising:
a front frame having a first pair of wheels;
a rear frame having a second pair of wheels;
a hitch pivotally coupling the front frame to the rear frame;
a powertrain configured to drive at least the second pair of wheels;
a steering system configured to provide controlled articulation of the front frame relative to the rear frame about the hitch based on a driver control input that is received by a driver while operating the articulated work vehicle;
a first sensor system configured to sense objects around the articulated work vehicle;
a second sensor system configured to sense real-time articulation angle of the front frame relative to the rear frame;
a third sensor system configured to sense real-time rotation of the first and second pair of wheels; and
real time processing circuitry electrically coupled to the steering system, the first sensor system, the second sensor system, and the third sensor system, the processing circuitry configured to:
    determine a safe-zone around the articulated work vehicle based on signals from the first sensor system corresponding to sensed objects around the articulated work vehicle;
    determine a position and velocity of one or more peripheral points on the articulated work vehicle based on signals from the second sensor system, and the third sensor system;
    receive the driver control input to control articulation of the front frame relative to the rear frame about the hitch;
    responsive to the receiving the driver control input to control articulation of the front frame relative to the rear frame about the hitch, determine whether to apply a limit to the driver control input by comparing a desired driver operator articulation angle associated with the received driver control input to the determined safe-zone around the articulated work vehicle; and
    responsive to the determining whether to apply the limit, apply the limit to the driver control input when a peripheral point on the articulated work vehicle is expected to be within a predetermined distance to a nearest edge of the safe-zone.

2. The articulated work vehicle of claim 1 further comprising:
    a hydraulically controlled tool; and
    a fourth sensor system configured to sense real-time position of the hydraulically controlled tool,
    wherein the real time processing circuitry is further configured to determine the position and velocity of one or more peripheral points on the articulated work vehicle based on signals from the fourth sensor system.

3. The articulated work vehicle of claim 1, wherein the limit to the driver control input is a reduction of the rate of articulation of the front frame.

4. The articulated work vehicle of claim 1, wherein the limit to the driver control input is a hard stop on the articulation of the front frame relative to the rear frame about the hitch.

5. The articulated work vehicle of claim 1, wherein the first sensor system includes one or more cameras.

6. The articulated work vehicle of claim 1, wherein the first sensor system includes one or more radar sensors.

7. The articulated work vehicle of claim 1, wherein the first sensor system includes one or more lidar sensors and/or one or more sonar sensors.

8. The articulated work vehicle of claim 1, wherein the processing circuitry is configured to dynamically adjust the safe-zone based on the signals from the first sensor system corresponding to sensed objects around the articulated work vehicle and/or dynamically adjust application of the limit to the driver control input based on the signals from the second sensor system and the third sensor system.

9. The articulated work vehicle of claim 1, wherein the second sensor system includes one or more rotary position sensors.

10. The articulated work vehicle of claim 1, wherein the third sensor system includes one or more rotation sensors.

11. The articulated work vehicle of claim 2, wherein the fourth sensor system includes one or more rotary position sensors.

12. A collision mitigation system integrated in an articulated work vehicle, the system comprising:
    a steering system configured to provide controlled articulation of the front frame relative to the rear frame about the hitch based on a driver control input that is received by a driver while operating the articulated work vehicle;
    a memory configured to store program instructions and sensor signals; and
    a controller in communication with the memory and the steering system, the controller configured to:
        determine a safe-zone around the articulated work vehicle based on signals from a first sensor system corresponding to sensed objects around the articulated work vehicle;
        determine a position and velocity of one or more peripheral points on the articulated work vehicle based on signals from the set of sensor systems operatively coupled to the articulated work vehicle;
        receive a driver control input, which is received by a driver while driving the articulated work vehicle, to control articulation of a front frame relative to a rear frame about a hitch of the articulated work vehicle;
        responsive to the receiving the driver control input to control articulation of the front frame relative to the rear frame about the hitch, determine whether to apply a limit to the driver control input by comparing a desired driver operator articulation angle associated with the received driver control input to the determined safe-zone around the articulated work vehicle;
        responsive to said determining whether to apply the limit, apply the limit to the driver control input when a peripheral point on the articulated work vehicle is expected to be within a predetermined distance to a nearest edge of the safe-zone; and
        control the steering system according to the limit to the driver control input.

13. The collision mitigation system of claim 12, wherein the limit to the driver control input is a reduction of the rate of articulation of a front frame relative to a rear frame about a hitch, of the articulated work vehicle.

14. The collision mitigation system of claim 12, wherein the limit to the driver control input is a hard stop on the articulation of a front frame relative to a rear frame about a hitch, of the articulated work vehicle.

15. The collision mitigation system of claim 12, wherein the first sensor system includes one or more cameras.

16. The collision mitigation system of claim 12, wherein the first sensor system includes one or more radar sensors.

17. The collision mitigation system of claim 12, wherein the first sensor system includes one or more lidar sensors.

18. The collision mitigation system of claim 12, wherein the first sensor system includes one or more sonar sensors.

19. The collision mitigation system of claim 12, wherein the set of sensor systems includes one or more position sensors and one or more rotary position sensors.

20. A method for mitigating collisions for an articulated work vehicle using a collision mitigation system implemented in the articulated work vehicle, the method comprising:
    determining, using circuitry of the articulated work vehicle, a safe-zone around the articulated work vehicle based on signals from a first sensor system corresponding to sensed objects around the articulated work vehicle;
    receiving, using the circuitry of the articulated work vehicle, signals from the set of sensor systems operatively coupled to the articulated work vehicle;

determining, using the circuitry of the articulated work vehicle, a position and velocity of one or more peripheral points on the articulated work vehicle based on signals from the set of sensor systems operatively coupled to the articulated work vehicle;

receiving, using the circuitry of the articulated work vehicle, a driver control input, which is received by a driver while operating the articulated work vehicle, to control articulation of a front frame relative to a rear frame about a hitch of the articulated work vehicle;

responsive to said receiving the driver control input to control articulation of the front frame relative to the rear frame about the hitch, determining, using the circuitry of the articulated work vehicle, whether to apply a limit to the driver control input by comparing a desired driver operator articulation angle associated with the received driver control input to the determined safe-zone around the articulated work vehicle;

responsive to said determining whether to apply the limit, applying, using the circuitry of the articulated work vehicle, the limit to the driver control input when a peripheral point on the articulated work vehicle is expected to be within a predetermined distance to a nearest edge of the safe-zone; and controlling, using the circuitry of the articulated work vehicle, the steering system according to the limit to the driver control input.

* * * * *